United States Patent [19]

Mori et al.

[11] 4,431,048
[45] Feb. 14, 1984

[54] HEAT-EXCHANGE FAN APPARATUS

[75] Inventors: Kunihito Mori, Toyonaka; Masao Torigoe, Itami; Toshiyoshi Yamamoto, Ibaraki, all of Japan

[73] Assignee: Matsushita Electric Industrial Co., Ltd., Kodoma, Japan

[21] Appl. No.: 296,246

[22] Filed: Aug. 24, 1981

[30] Foreign Application Priority Data

Sep. 1, 1980 [JP] Japan .............................. 55-121644
Oct. 15, 1980 [JP] Japan .............................. 55-144947
Mar. 4, 1981 [JP] Japan .............................. 56-31843

[51] Int. Cl.³ ........................ F28D 11/02; F28F 13/12
[52] U.S. Cl. ................................................ 165/88
[58] Field of Search ................ 165/88, 86, 121, 185

[56] References Cited

U.S. PATENT DOCUMENTS 2,402,307  6/1946  Vannerus ........................... 165/88
2,794,135  5/1957  Swendsen ....................... 165/86 X

FOREIGN PATENT DOCUMENTS 3134521  3/1982  Fed. Rep. of Germany ...... 165/121
53-124373  10/1978  Japan .

Primary Examiner—Sheldon J. Richter
Attorney, Agent, or Firm—Cushman, Darby & Cushman

[57] ABSTRACT

An apparatus for effecting forced circulations of two separate fluids through separate fluids paths provided therein and, simultaneously, heat-exchanging between the fluids in a single unit is disclosed. It includes an impeller having a concentric corrugated zone made of a thin sheet material of good heat-conducting property, supported by a central disk member and an annular peripheral member, along both side of which flows of separate fluids are created, when the impeller is rotated. The heat-exchanging between the fluids each having a temperature difference with respect to the other is performed through the corrugated zone which the fluids are propelled through said paths.

14 Claims, 15 Drawing Figures

HEAT-EXCHANGE FAN APPARATUS

BACKGROUND OF THE INVENTION

1. Field of the Invention

The present invention relates to a heat-exchange apparatus. Particularly, it is concerned with an apparatus capable of effecting forced circulations of two separate fluids through the apparatus without any substantial intermingling therebetween as well as of effecting a heat-exchanging between said two fluids. That is, the present invention intends to realize both functions of a fan or blower and of a heat-exchanger.

2. Description of the Prior Art

In the past, a heat-exchange between two fluids is normally performed by means of two separate blowers or fluid pumps, each of which feeds either of said fluids at high temperature side and low temperature side to a heat exchanging unit. Flow rates of said fluids to be fed to the unit may generally be controlled at the high and low temperature sides, respectively in order to maintain the efficiency of said heat-exchanging unit to an optimum point.

The above-described system, comprising two separate fluid-driving units at both of the high and low temperature sides and a stationary heat exchanging unit, however, has a drawback in its complexity of the arrangement and its bulkyness of the total system.

An alternative system in the prior arts employs a rotating heat-exchanging element which serves to propel the fluids as well as to effect heat-exchanging therebetween. In one of such a system, each of the fluids is propelled along either face of the interior or exterior of a pipe of heat-conducting material which rotates and exerts a centrifugal force on each of the fluids. Most of such an apparatus need to have a complex structure which might mean increased cost. Durability of the apparatus is also dubious in that its key component, the heat-exchanging unit might frequently get clogged.

SUMMARY OF THE INVENTION

It is therefore the primary object of the present invention to provide a heat-exchange fan apparatus which performs both functions of forced circulations of two separate fluids, each differs from the other in their temperature and, simultaneously, of heat-exchanging therebetween without substantial intermingling, in one unitary apparatus of a single driving unit.

It is another object of the present invention to provide an apparatus which performs the stated two functions in a simple and easy manner.

It is a further object of the present invention to provide an apparatus which performs the stated two functions and is of a durable and easy-to-build structure.

It is a still other object of the present invention to provide an apparatus of the stated two functions, being further capable of adjusting the flow rates of the respective fluids in order to increase the efficiency in the heat-exchange (transfer) from the fluid at high temperature to one at low temperature. By arbitrarily adjusting the flow rates of the respective fluids, it is made possible to maintain a desired heat-exchanging efficiency in a mode wherein, for instance, a small quantity of air at high temperature is cooled by a fluid having only a small temperature difference.

According to the present invention there is provided a heat-exchange fan apparatus for effecting forced circulations of two separate fluids through separate paths and, at the same time, heat-exchanging therebetween; comprising (1) a housing which defines a space and encloses, (2) a fluid impeller made of heat-conducting material of centrifugal thin-disk-type having an axis of rotation and defining a space of rotating body including at least one plane perpendicular to said axis, and (3) a partition wall sharing one of said plane with said impeller, having an opening which encircles said impeller and, in combination with said impeller, serving to divide the space defined by said housing into two compartments, each of which forms a conduit for each of said separate fluids so that each fluid is fed to the housing from either side of the impeller in a substantially axial direction and expelled therefrom in a substantially radial direction with respect to said impeller, wherein characterized in that; said impeller has a concentric corrugated zone of doughnut configuration composed of a multiplicity of radially-extended ridges and complementary grooves which are terminated and merged into one of said plane at their respective ends.

The impeller may be embodied in a variety of ways. The outer periphery of said corrugated zone of doughnut configuration may be supported by an annular peripheral member and the inner periphery thereof may be supported by a central disk member having a center hab which receives a shaft at its axis of rotation. The outer ends of said ridges may be sealed with laterally-projected comb-teeth members provided on both sides of said annular peripheral member at its inner circumference in an alternative manner, while the inner ends of said ridges may be sealed with laterally-projected comb-teeth members provided on the outer periphery of the central disk member in a similar manner.

The outer circumference of the annular peripheral member may be splitted into two layers so that it can associate with the inner circumference of the opening of the partition wall to form an intricated combination which serves to avoid or at least minimize the possible intermingling of one fluid with the other flowing through the separate compartments.

Each of said ridges on one side of the impeller may be laterally projected in greater extent as compared with each of those on the other side with respect to said plane so that the cross-sectional area of said conduit for one of said fluids is made greater than that for the other. By so arranging, the flow rates of the respective fluids can arbitrarily be adjusted.

Said ridges may alternatively be formed to have cross-sections of a rounded-rectangular which are sealed with said comb-teeth members at its both ends, and each of said cross-sections of the ridges on one side of the impeller may have a greater width as compared with those on the other side to attain the same object.

The corrugation may be formed on a doughnut zone of the impeller integrally with the central disk member and annular peripheral member. The laterally-projected comb-teeth members for supporting said ridges of the corrugated zone integrally with the central disk member and the annular peripheral member. The corrugated zone of the doughnut configuration may preferably be made of a metal having a good heat-conducting property. The central disk member and the annular peripheral member may preferably be made of a polymeric or metallic material together with the comb-teeth members.

Alternatively, the corrugation of the doughnut configuration may be formed by seaming a corrugated thin plate with a skeleton structure composed of the central disk member and annular peripheral member with a multiplicity of laterally-projected comb-teeth members, being connected together with a multiplicity of rib members at the apexes of said comb-teeth members.

The impeller may define a space of rotating body which includes two parallel planes both perpendicular to said axis of rotation, one represents a central disk member, and the other represents an annular peripheral member and the plane of said partition wall; the inner periphery of said concentric corrugated zone is terminated at and its ridges are merged into said central disk member and the outer periphery of said concentric corrugated zone is terminated at and its ridges are merged into said annular peripheral member.

The inner ends of the ridges of the corrugated zone may be sealed with a multiplicity of comb-teeth members laterally projected from one side of the outer periphery of said central disk member, and the outer ends of the ridges of the corrugated zone may be sealed with a multiplicity of comb-teeth members laterally projected from one side of the inner peripherhy of said annular peripheral member.

DESCRIPTION OF THE PREFERRED EMBODIMENT

In the following description, the present invention will be elucidated in more detail by way of examples shown in the attached drawings.

Figure 1:
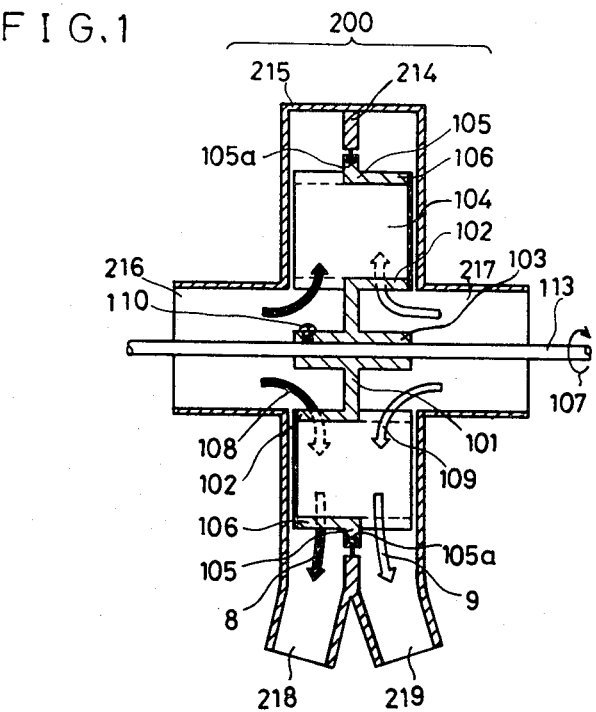
FIG. 1 is a cross-sectional view of a heat-exchange fan apparatus embodying the present invention, cut-out along a plane including its axis of rotation.

FIG. 1 is a cross-sectional view of the heat-exchange fan apparatus embodying the present invention, cut-out along a plane including the axis of rotation of the impeller, wherein a housing generally represented by numeral 200 defines a space and encloses a fluid impeller generally represented by numerals 100 and a partition wall 214 fixed to the housing 200. Other components will be described below, in connection with the illustration of the subsequent figures.

Figure 2:
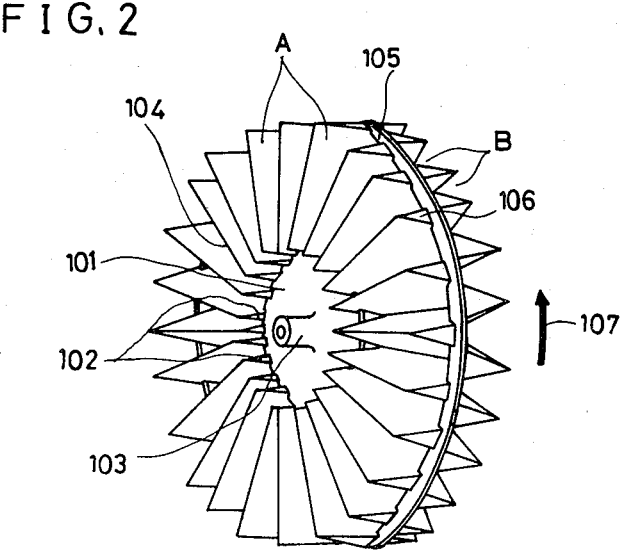
FIG. 2 is a perspective view of the impeller to be assembled in the apparatus shown in FIG. 1.

In FIG. 2, the fluid impeller 100 is shown in a perspective view, in which numeral 101 represents a central disk member made of a metal or polymeric material, having a center hub 103 which receives a rotating shaft 113 and having a multiplicity of laterally-projected comb-teeth members 102 at its periphery.

Each of the comb-teeth members 102 fits to each of ridges A at its inner end to support a concentric corrugated zone 104 of doughnut configuration.

The corrugated zone 104 is composed of a multiplicity of radially-extended ridges A and complementary grooves B and is usually made of thin heat-conducting metal or polymeric material. The outer ends of the ridges A is sealed with and supported by a multiplicity of laterally-projected comb-teeth members 106 provided on an inner circumference of an annular peripheral member 105 made of a metal or polymeric material. In order to attain a good heat-exchanging performance, it is effective to built the corrugated zone 104 with a thin sheet of good heat-conductance, such as aluminum or stainless steel. Although a sheet as thin as possible is preferred for embodying the corrugated zone 104 in view of the desired heat-exchanging performance, care should also be taken so that its mechanical strength is not curtailed excessively, and an aluminum sheet of 0.1 mm in thickness is found to meet the both requirement satisfactorily in this specific embodiment. The corrugated structure inherently has a sufficient rigidity for the relatively thin material of good heat-exchanging performance, as compared with a plain sheet of the same thickness.

Figure 3:
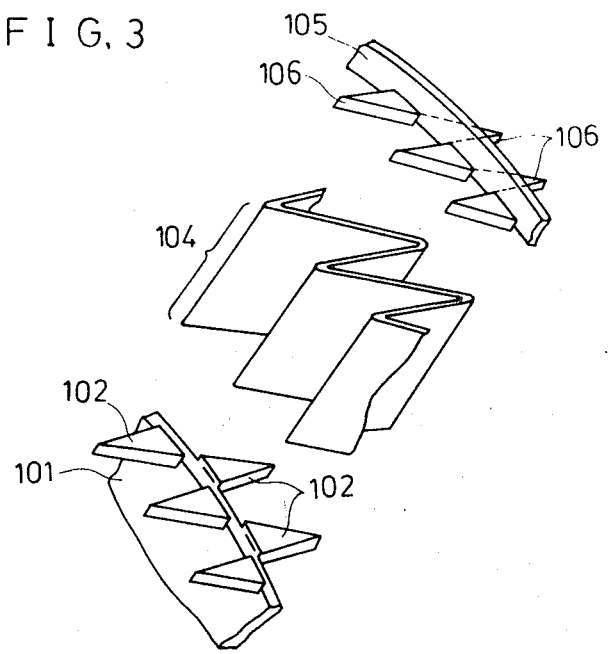
FIG. 3 is an exploded view of a part of the impeller shown in FIG. 2.
Figure 4:
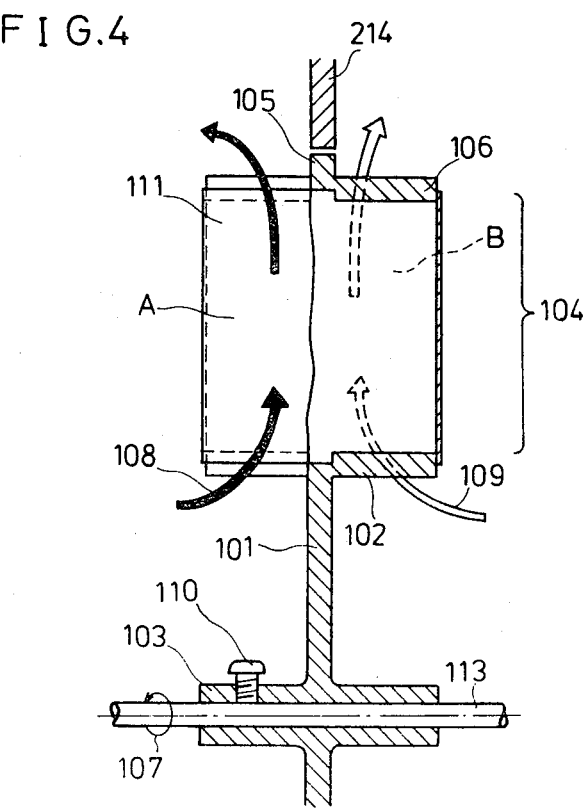
FIG. 4 is a cross-sectional view of the impeller shown in FIGS. 2 and 3.

Connections between the inner ends of the ridges A of the corrugated zone 104 and the comb-teeth members 102 projected from the central disk member 101, and those between the outer ends of the ridges A and the comb-teeth members 106 on the annular member 105 are made by means of, for instance, by gluing with an adhesive or welding, in a gas-tight manner at their sealed parts, so that the ridges A cover or override the comb-teeth members 102 and 106. FIG. 3 illustrates the details of modes of the fitting joints and of the relations between and among the participating components. Alternatively, the whole structure of the impeller 100 may have an integrated body of a single sheet material. In such case the corrugated zone may be stamped out from a metal sheet. In FIGS. 1 and 4, an arrow 107 indicates the rotational direction of the impeller.

FIG. 4 is a cross-sectional view of the impeller 100 along a plane including the axis of rotation and shows flows of fluids at both sides of the impeller 100 effected when the latter rotates. In FIG. 4, a solid black arrow 108 indicates the direction of fluid flowing along one of the grooves at the opposite side of ridges A while a double white arrow 109 indicates that flowing along another of the grooves B adjacent to and at the opposite side of the first mentioned one separated by the thin sheet 111 which forms the corrugated zone 104. The two fluids are never intermingled but transfer of the calorific value between the fluids is effected by conduction through the sheet material 111. In FIG. 4, numeral 110 represents a bolt screwed into a threaded hole provided on the hub 103 to retain a rotating shaft 113.

Figure 5:
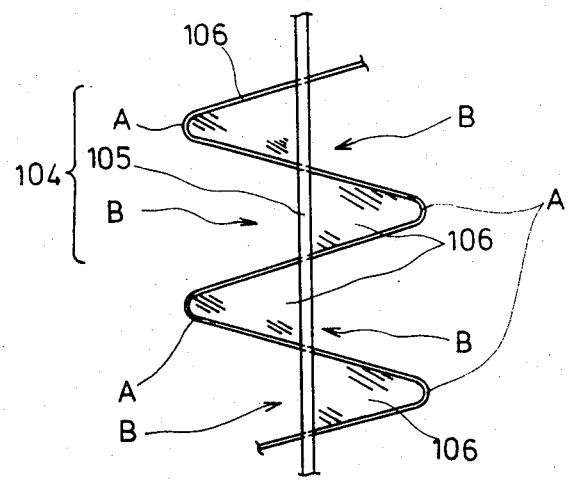
FIG. 5 is a schematic view of a part of the impeller extended along and viewed from its periphery.

FIG. 5 is a schematic view of a part of the impeller 100 including the corrugated zone 104 shown in FIGS. 1-4, extended along and viewed from its periphery, and specifically shows the mode of sealing the outer ends of the ridges A with the comb-teeth members 106, projected laterally from the annular peripheral member 105. In FIG. 5, the fluids flowing from the backside of the drawing along the grooves B collide against the comb-teeth member 106, and deflected to be expelled from the region of the corrugated zone through the unsealed halves of the ridges A, in a direction substantially perpendicular to the plane of the drawing.

Now, let us return to FIG. 1, wherein a cross-section of the heat-exchange fan apparatus, which includes the impeller 100 as has been illustrated by referring to FIG. 2-5, is shown. Numeral 113 represents a shaft for rotating the impeller 100, and is received by the hub 103 and is retained by a screw 110. The partition wall 214 is provided on an interior of an impeller enclosure 215 of the housing, and in a "loose fit" or "running fit" with respect to a prepheral groove 105a engraved around the annular member 105, so that it, in combination with the impeller 100, divide the impeller into two compartments. One of the compartment is connected to a fluid inlet 216 and the other is connected to another fluid inlet 217, both of which introduce the fluids from both sides of the impeller into the impeller region in the axial direction. The impeller enclosure 215 further includes a branched set of two fluid outlets 218 and 219 which conduct to expel the fluids from the impeller region in the radial direction.

Figure 6:
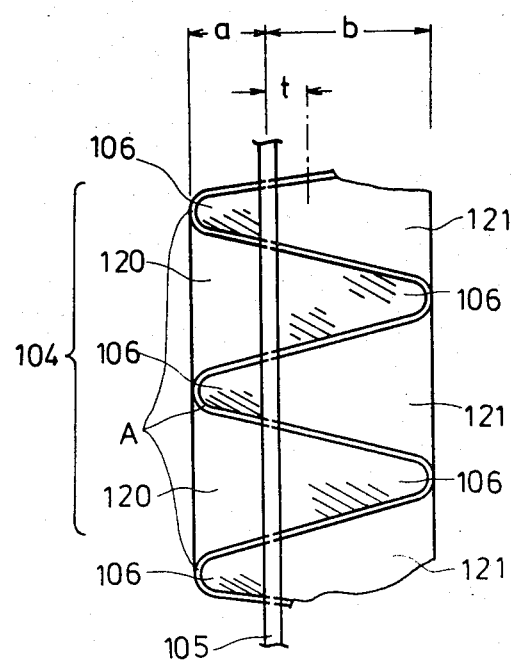
FIGS. 6 and 7 are schematic views similar to FIG. 5 of impeller to be used in other embodiments.

FIG. 6 is a schematic view of a part of an impeller 100 including the corrugated zone 104, to be used in another embodiment of the present invention, extended along and viewed from its periphery, wherein the same or similar numerals are used to indicate the same or corresponding components. As shown in the drawing, the relation between the corrugated zone 104, and the plane defined by the central disk member 101 and the annular peripheral member 105 is somewhat different from that already shown. Namely, by shifting said plane from a mid-plane of the corrugated zone 104 by t in the axial direction of the impeller 100, the ratio of the height of the ridges 114 is made to a:b (a<b), to give a difference to the fluid paths 120 and 121 in their cross-sectional areas, and the ratio of the fluids flowing along the both sides of the impeller 100 are changed accordingly.

Figure 7:
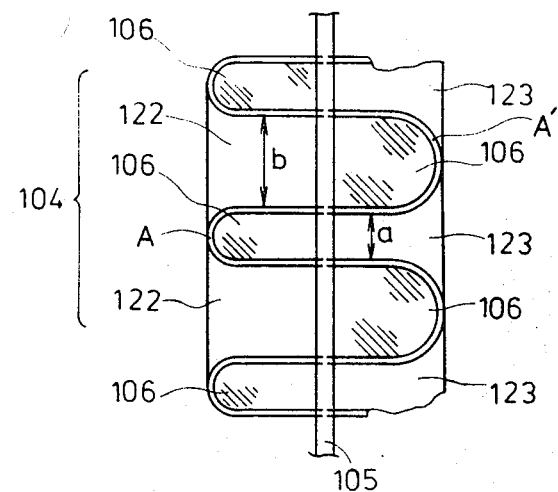

FIG. 7, which is a drawing similar to FIG. 5 or 6, shows a further means for changing the ratio in the respective quantities of the fluids flowing along the both sides of the impeller 100, wherein the same or similar reference numerals are used to indicate the same or corresponding parts of components. In this embodiment, the widthes a of the ridges A on one side of the corrugated zone 104 is shaped to be smaller than that b on the other side. Accordingly, the complementary grooves on the one side which correspond to the first fluid paths 122 are made greater in its cross-sectional area than those on the other side which correspond to the second fluid path 123, to vary the ratio of the fluids flowing through the paths.

Various types of the corrugated zone 104 other than those shown in FIGS. 6 and 7 may be proposed for changing the cross-sectional areas of the fluid paths flowing along the both sides of the impeller 100, and a combination of concepts embodied as shown in FIGS. 6 and 7, i.e., an embodiment having both features may also be utilized for the purpose.

Figure 8:
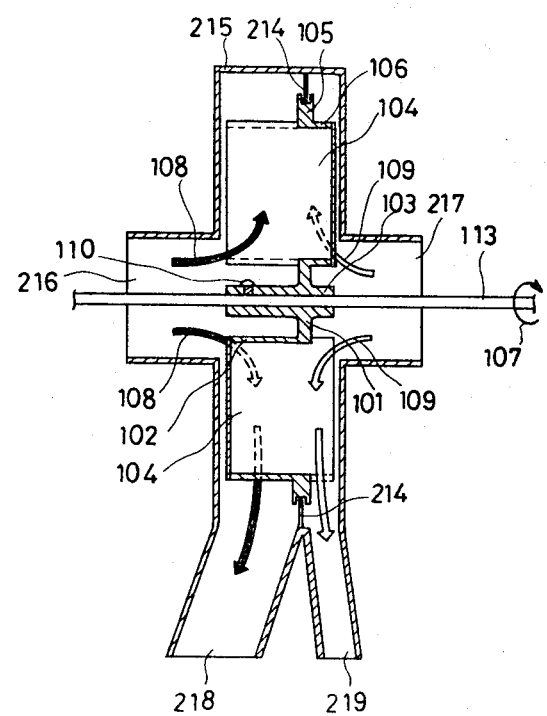
FIG. 8 is a cross-sectional view of the heat-exchange fan apparatus as another embodiment of the present invention, wherein the impeller shown in FIG. 6 is assembled.

FIG. 8 is a cross-sectional view of the embodiment of the heat-exchange fan apparatus which includes an impeller 100 having a corrugated zone 104 of a mid-plane being shifted from the plane of the central disk member 101 and the annular peripheral member 105 as shown in FIG. 6. In this figure, the same or similar reference numerals are used again to indicate the same or corresponding parts or components.

Figure 9:
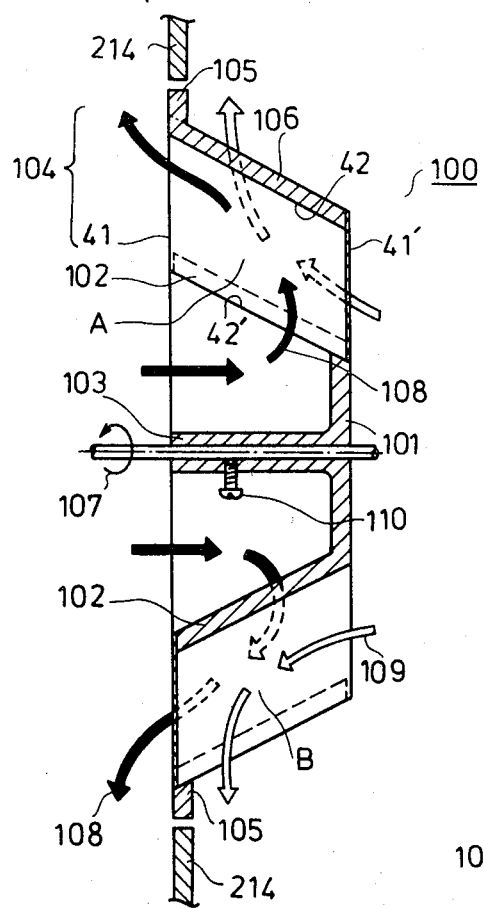
FIG. 9 is a cross-sectional view of an impeller to be used in another embodiment of the present invention.
Figure 10:
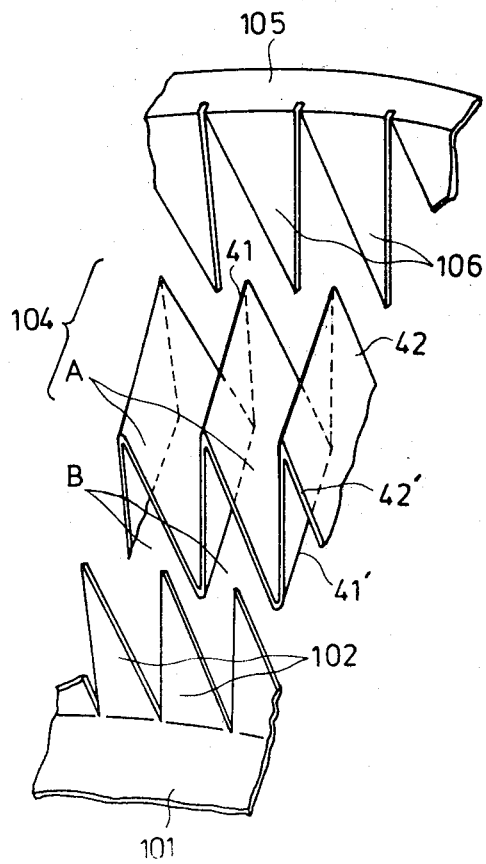
FIG. 10 is an exploded view of a part of the impeller shown in FIG. 9.

FIGS. 9 and 10 are a cross-sectional view and an exploded perspective view, respectively, of an impeller intended to be assembled into another type of the apparatus embodying the present invention, wherein the same or similar reference numerals are used again to indicate the similar or corresponding parts or components. In this embodiment, an extreme change in the conditions of the fluids flowing along the both side of the impeller is intended primarily for improving the heat-exchange efficiency of the apparatus. Both sets of the comb-teeth members 102 and 106 laterally projected from the central disk member 101 and the annular peripheral member 105 present themselves only on their either lateral side instead of being provided on both sides in an alternate manner. In this impeller, each of the comb-teeth members 102 of the central disk member 101 is arranged so that it is facing to each of the vacant spaces between the comb-teeth members 106 of the annular peripheral member 105 and vise versa. The doughnut-shape corrugated zone 104 connects them to form the impeller 100. In each segment of the corrugated zone 104, the edges 42 and 42' to be bonded to the comb-teeth members are oblique to other two edges 41 and 41'. In this sence, the central disk member 101 occupies a different plane from that is defined by the annular peripheral member 105 and inside edge part of the partition wall 214, with respect to the axial direction of the impeller to make a large difference between the conditions of the fluids flowing along the both sides of the impeller 100. Both of the inside and outside ends of the ridges A and complementary grooves B which constitute the corrugated zone 104 are sealed by the multiplicity of the comb-teeth members 102 and 106, projected from the confronting lateral sides of the central disk members 101 and the annular peripheral member 105, respectively. The comb-teeth members have oblique planes to the direction of the axis of the shaft.

In the arrangements of the apparatus which have been elucidated in the foregoing description referring to FIGS. 1-10, when the shaft 113 and the impeller 110 affixed thereto are rotated, two separate flows of fluids 108 and 109 will take place along the grooves B between the ridges B on the respective sides of the corrugated zone 104. Either of the two fluids forms an adjacent flow with respect to the other, interposed by the sheet of the corrugated zone 104. Furthermore, by virtue of the comb-teeth members 102 and 106 provided on the central disk member 101 and the annular peripheral member 105 to stop the both open ends of the ridges A, one of the flows is never intermingled with the other, being completely separated by the interposed sheet of the corrugated zone 104.

In the stated conditions, when a temperature difference occurs between the both flows 108 and 109 of the fluids, the fluid flowing along a high temperature side will lose its calorific value to lower its temperature while that along a low temperature side will be fed with he calorific value to rise its temperature.

When the heat-exchange is effected in accordance with the above-mentioned principle, if the corrugated zone 104 is designed so that its fluid paths 120, 121, 122 and 123 along the both sides are different from each other in their cross-sectional areas as have been shown in FIGS. 6 and 7, the fluids flowing through the path 121 or 122 will be greater than those flowing through the path 120 or 123 to effect a difference in the fluid quantity between the both sides of the corrugated zone 104.

Since the heat transferring area of the corrugated zone 104 of the arrangement of the present invention is constant, if the fluid flowing through the paths of the low temperature side is set to be greater than that through the paths of the high temperature side, the temperature of the former side may be lowered as compared with that of the latter side to make the temperature difference at the heat-transferring interface greater and to rise the heat-exchanging efficiency. Alternatively, if the fluid flowing through the paths of the low temperature side is set to be smaller than that through the paths of the high temperature side, it is possible to obtain an expelled fluid of a higher temperature at the outlet 218 or 219 of the low temperature side.

Incidentally, in the case wherein the comb-teeth members 102 and 106 are provided solely at the either lateral sides of the central disk member 101 and the annular peripheral member 105 as shown in FIGS. 9 and 10, the fluid flow 108 stands still at the sealing points of the corrugated zone 104 with the comb teeth member 106, whereas the fluid 109 stands still at the sealing point of the corrugated zone 104 with the comb-teeth member 106, both attributable to losses in the fluid momentum. In contrast to this, in the impellers described with reference to FIGS. 1–8, both of the sealing points of the inner and outer ends of the corrugated zone 104 with the comb-teeth members 102 and 106 are parts where losses take place as specifically elucidated in FIG. 4. Accordingly, four corners of the heat transferring interface sandwiched between the fluid flows 108 and 109 form the parts where the losses are entailed in the impeller shown in FIG. 4, respectively.

Namely, the numbers of the parts where the losses take place are reduced to two for each ridge in the impeller shown in FIGS. 9 and 10 as compared with the four in the impeller shown in FIG. 4. If the heat-transferring areas of the impellers are set to be the same for the both, the fewer parts, where the losses are entailed, in the impeller shown in FIGS. 9 and 10, can apparently maintain a larger effective heat-transferring areas and a high heat exchanging efficiency as compared with the impellers described reference to FIGS. 1–8.

Figure 11:
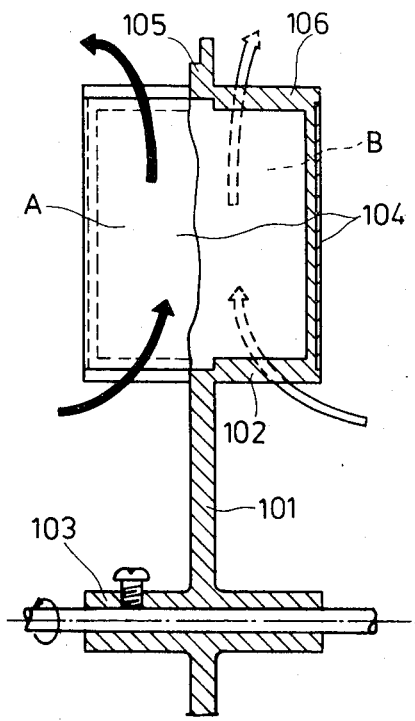
FIG. 11 is a cross-sectional view of an impeller of a different mode of structure.
Figure 12:
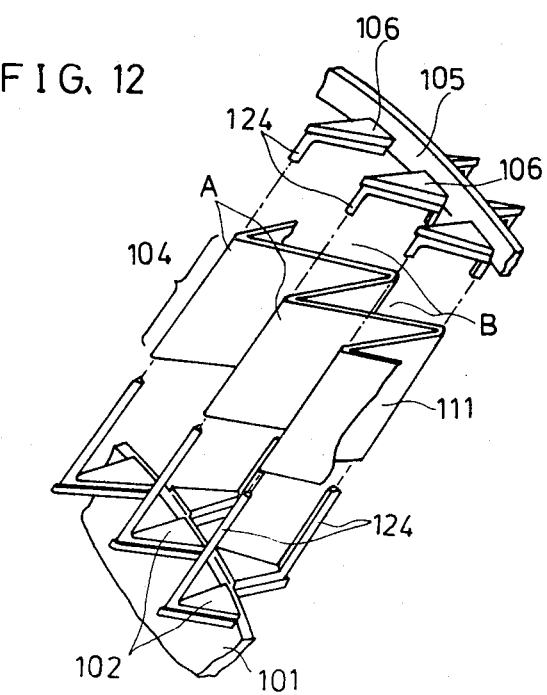
FIG. 12 is an exploded view of a part of the impeller shown in FIG. 11.

FIGS. 11 and 12 are a cross-sectional view and an exploded perspective view, respectively, of another variation of the impeller intended to be assembled into the apparatus embodying the present invention, wherein the same or similar reference numerals are used again to indicate the similar or corresponding parts or components. This impeller is, however, built in a skeletal structure composed of the central disk member 101 and the annular peripheral member 105 connected with a multiplicity of ribs 124. The ribs 124 are bridging apexes of the triangular comb-teeth members 102 and 106 together; and serving for reinforcing the sheet 111 of the corrugated doughnut-shaped zone 104. Since the ribs 124 are provided at the bottoms of the grooves B (therefore, just beneath the apexes of the ridges A) of the corrugated zone 104, they are effective for increasing the mechanical strength of the corrugated zone 104 and for preventing it from deformation. In addition to this, since a thinner sheet material can be employed for the sheet 111 of the corrugated zone 104, the heat transferring will be performed more preferably with this arrangement, and the resultant heat-exchanging efficiency will be raised accordingly.

In FIGS. 11 and 12, the central disk member 101 and the annular peripheral member 105 are shown to be integrally molded and held together as a unit by the multiplicity of the rib members 124. By so designing, the mass-producibility of the impeller may be much improved and its precision may be raised.

As previously described, by embodying an impeller of a centrifugal type with a thin sheet of corrugated structure in accordance with the present invention, it is made possible to build a fan apparatus of a dual construction having two separate conduit for two fluids flowing along the both sides of the impeller and, at the same time, to provide a heat-exchanger of high efficiency by utilizing the temperature difference took place between the fluids flowing the paths of the both sides. In this apparatus, since the impeller itself serves as a heat-exchanger, the flow rates of the fluids contacting the heat transferring interface can be maintained high enough to make the temperature difference between the both surfaces of the heat-transferring zone constant and to minimize the staining of the heat-transferring surfaces.

Furthermore, since the two separate fluids flowing along the both sides of the impeller can be maintained in the states of turbulent flows to effectively prevent the development of boundary layers of the fluid having a temperature gradient, the heat-exchanging efficiency of the apparatus can be made very high. In addition to this, no separate provision of fluid pump or blower is required for propelling the fluids in this apparatus, as has hitherto been considered to be indispensable for the conventional heat-exchanging system.

The present invention has another advantage in that, a heat-exchanging performance in compliance with the required condition can be obtained by adjusting the fluids-flowing along the both sides of the impeller in their quantities, and the heat-exchanging efficiency can further be improved if the apparatus is embodied as shown in FIG. 9.

Moreover, if the comb-teeth members are integrally molded with the central disk member or the annular peripheral member as a unit component, the workability in molding with polymeric or metal material can be made preferable and advantageous in view point of the production. And, if the integrally-molded central disk member and annular peripheral member are held together by the multiplicity of rib members, the mechanical strength of the impeller itself and its ability of supporting the corrugated zone can be much improved to allow one to use a thinner sheet material having a higher heat-conducting property in embodying the corrugated zone.

The heat-exchanging efficiency between the high temperature fluid and the low temperature fluid can be course be improved by constructing the corrugated zone of the impeller with a metal or polymeric material of good heat-conductivity, for instance, stainless steel or aluminum.

Figure 13:
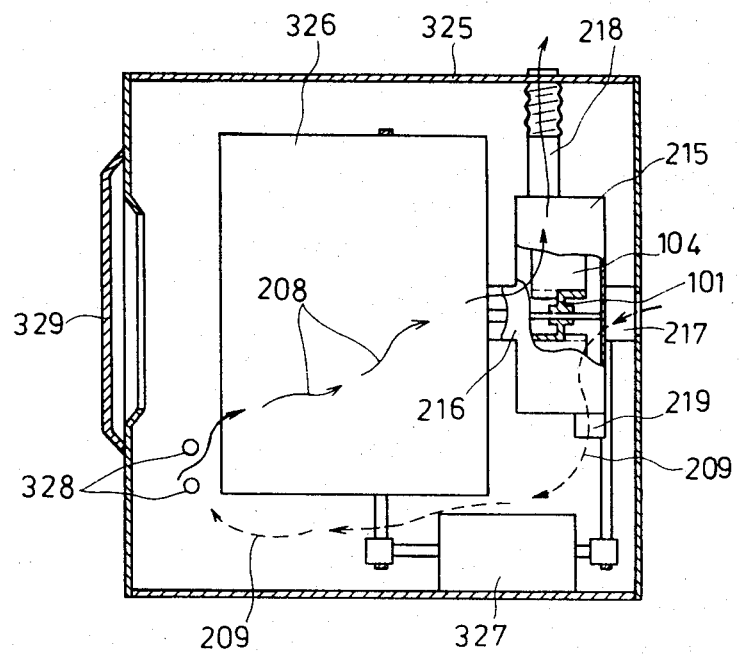
FIG. 13 is a cross-sectional view of a clothing dryer, wherein an apparatus of the present invention is included.

In a case wherein the fluids flowing along the paths of the both sides of the corrugated zone 104 of the impeller 100 are air, the apparatus of the present invention can be applied to a clothing dryer and to a ventilating system. FIG. 13 shows an example of such the clothing dryer into which the apparatus of the present invention is incorporated. In FIG. 13, numeral 325 designates a housing of the dryer, 326 is a rotary drum for accomodating the clothes driven by a motor 327, numeral 328 represents an electric heater and numeral 329 is a door for introducing the clothes into the rotary drum 326. The motor 327 mounted in the housing 325 can also serve for driving the fan apparatus of the present invention. When illustration of this clothes dryer is made in association with the apparatus shown in FIG. 1, the latter is designed to such the outside air through the fluid inlet 217 as an air flow 209 with the rotation of the impeller having the corrugated zone 104 and the flow is then expelled from the impeller region 215 through the outlet 219 to force itself into the housing 325. On the other hand, the air flow 209 is followed by another air flow 208 which is to be sucked through the inlet 216 into the impeller region 215 and finally expelled therefrom through the outlet 218. By passing through the region of the heater 328, the air flow 209 is heated to become the air flow 208 of an elevated temperature to effect the drying of the clothes in the rotary drum 326. Since the air flow 208 which has performed the drying of the clothes is still high in temperature as compared with the air flow 209 which is to be freshly introduced into the impeller region 215, a heat-exchange between the two air flows 208 and 209 is effected through the corrugated zone 104 of the impeller, to lower the temperature of the air flow 208 and to elevate that of the air flow 209. This function prevents the space surrounding the dryer from an abnormal and unpleasant rise in temperature and also serves to preheat the fresh air to be used for the drying to improve the thermal efficiency of the total system. Furthermore, the illustrated dryer is still advantageous in that it does not need a separate fluid pump or blower for propelling the drying air.

Figure 14:
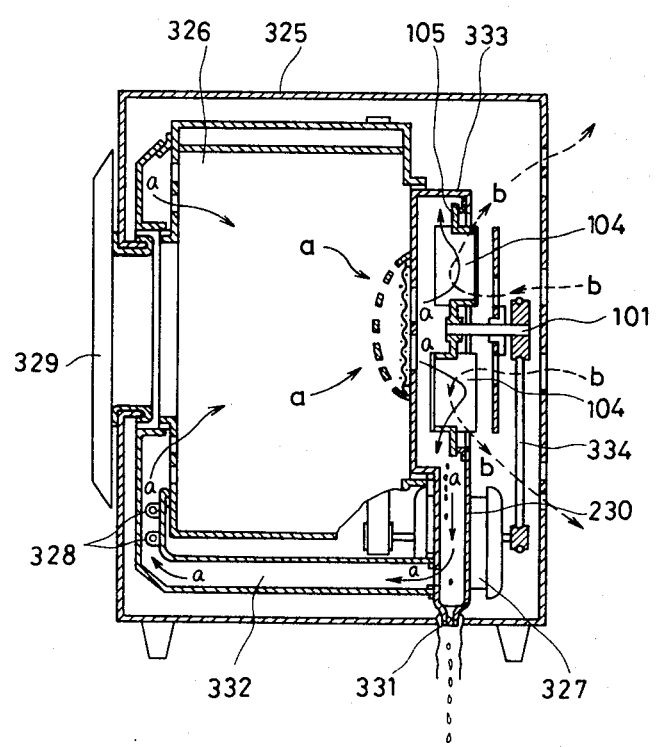
FIG. 14 is a cross-sectional view of a clothing dryer of dehumidifying type, wherein an apparatus of the present invention is used as a moisture condensing unit.

FIG. 14 shows an example wherein the fan apparatus of the present apparatus is incorporated into a clothing dryer of dehumidifying-type and the same or similar reference numerals as in FIG. 13 are used to designate the equivalent or corresponding parts or components.

The clothing dryer of dehumidifying-type, defined here, has an arrangement as shown in FIG. 14 wherein air flows designated by arrows a which serves to dry the clothes, will not allowed to be expelled from the housing but will circulate through circulating paths including the rotary drum 326 wherein it is given a moisture by wet clothes. The moisture contained in a air flows a condenses itself into liquid at the heat-exchanging part of the apparatus and is expelled from the housing as dew drops. The dehumidified air flow is heated again by the heater 328 and then fed to the rotary drum 326, wherein it repeatedly serves to dry the wet clothes.

In the shown clothing dryer of dehumidifying-type, the fan apparatus of the present invention serves to propel the drying air in the direction of the arrows a on one side of its corrugated zone 104 and propel the air outside of the housing in the direction of the arrows b on the opposite side of its corrugated zone 104. By propelling the air as shown by the arrows a and b, the heat-exchange between the both airs can be effected through the corrugated zone 104 of the impeller. During the heat-exchanging operation, the air of high temperature and high humidity is propelled along the arrows a and is cooled by the air for cooling being propelled in the direction of the arrows b. By this cooling, the moisture contained in the air of high temperature and high humidity is condensed into liquid to drain as dew drops through a drainage pipe 230 affixed to the impeller housing and is expelled from the dryer through an outlet 331.

Although this type of clothing dryer cannot be provided with the function of preheating the air for drying as in the dryer shown in FIG. 13, the moisture contained in the drying air can be removed in an alternative manner. In addition to the dehumidifying function, the propellings of the circulating air and the cooling air in the directions of the arrows a and b can be performed at the same time. In FIG. 14, numeral 332 designates a circulating path for the drying air, 333 is a sealing member which is in a running fit to the annular peripheral member 105 of the impeller, and 334 represents a fan belt.

Figure 15:
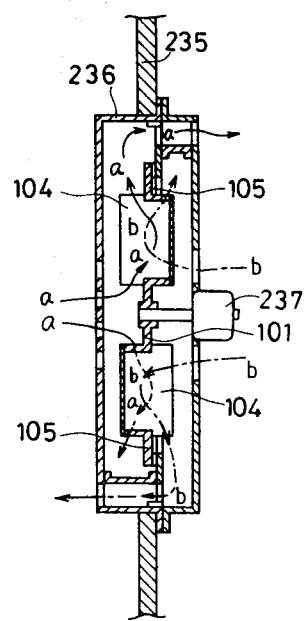
FIG. 15 is a cross-sectional view of an embodiment of the present invention used in a room ventilating system.

FIG. 15 shows an example wherein the apparatus of the present invention is applied to a ventilating system and the housing of the apparatus 236 is fit to an opening of the room wall 235. By the rotation of the impeller driven by a motor, the air in the room is sucked into the housing and expelled therefrom in the direction of the arrows a. On the other hand, the outdoor air is sucked into the housing and forced to be introduced into the room along the direction of the arrows b. During the propelling operation, a heat-exchange between the airs along the direction of the arrows a and b is effected at the corrugated zone 104 of the impeller.

The indoor air in the room is frequently cooled in summer and warmed in winter but is still required to be ventilated. If the ventilating apparatus stated above is employed, only little adverse influence is expected on the efficiency in room cooling or warming, because only small change takes place in the room temperature. Namely, the heat of the air to be expelled along the arrows a is conducted to the outdoor air to be introduced into the room along the arrows b through the corrugated zone by virtue of its heat-exchanging function to invite a result that the cooled or heated air is introduced into the room. The efficiency in the room cooling or heating might remarkably be reduced if the indoor air is simply expelled out to introduce the fresh air.

The apparatus of the present invention may also be applied to a system wherein a liquid and an air (gas) are propelled at either side of the impeller and a heat-exchange therebetween is also effected. For instance, in order to raise temperature of water, it may be propelled along one side of the corrugated zone of the impeller while an exhaust gas obtained by combusting a hydrocarbon oil or gas is propelled along the opposite side. Namely, a water boiling apparatus can be embodied.

Furthermore, as a result of propelling a refregerant along one side and air along the opposite side of the corrugated zone of the impeller, the air is cooled and by feeding the cooled air to a room, a room-cooling function may be performed. Namely, a room cooling can also be embodied.

As indicated above, according to the present invention, it is made possible to provide a highly practical fan apparatus having heat-exchanging function. Its simple structure and low manufacturing cost reflect on the easy maintenance and high heat-exchanging efficiency on the apparatus.

What is claimed is:

1. A heat-exchange fan apparatus for effecting forced circulations of two separate fluids through separate paths and, at the same time, with heat exchanging relation therebetween, said fan having a centrifugal impeller of thin-disk type, made with heat-conducting material, and having an axis of rotation,
characterized in that:
said impeller has a concentric corrugated part made with corrugated thin sheet having a number of corrugations forming grooves and ridges substantially radially extending on both sides thereof and being disposed around said axis, and
a narrow ring shaped part is provided at the periphery of said impeller and which is on a plane perpendicular to said axis and continuous with the peripheral ends of said corrugated thin sheet,
at least a part of the end parts of said grooves of said corrugated thin sheet at the outer periphery of said impeller forms open ends facing in a radially outward direction,
said grooves on one side and on the other side of said impeller forming channels for the two separate fluids flowing in a radial direction in each groove upon the rotation of said impeller,
with said corrugated thin sheet isolating the two separate fluids and allowing a heat-exchange between said separate fluid thereacross, and
said open ends at the outer periphery of said grooves forming an outlet for said separate fluids flowing outwards in a substantially radial direction.

2. A heat-exchange fan apparatus as claimed in claim 1 further comprising:
a housing which defines a space therein and encloses said impeller,
a partition wall having a circular opening for receiving said impeller therein and, in combination with said impeller, dividing said space defined by said housing into two compartments, each of which forms a conduit for each of the separate fluids so that each fluid is fed to the grooves of said impeller at the center part of the impeller in a substantially axial direction from each side of the impeller and expelled from said open ends of said grooves in said substantially radial direction with respect to said impeller.

3. A heat-exchange fan apparatus as claim in claim 2, wherein each of the ridges on one side of the impeller is laterally projected in greater extent as compared with each of said ridges on the other side with respect to said plane so that the cross-sectional area of said conduit for one of said fluids is made smaller than that for the other.

4. A heat-exchange fan apparatus as claimed in claim 2, wherein the ridges are formed to have cross-sections of a rounded-rectangular which are sealed with said saw-teeth members at its both ends, and each of said cross-sections of the ridges on one side of the impeller has a greater width as compared with those on the other side so that the cross-sectional area of said conduit for one of said fluids is made smaller than that of the other.

5. A heat-exchange fan apparatus as claimed in claim 2, wherein the outer periphery of said corrugated part is supported by an annular peripheral member and the inner periphery thereof is supported by a central disk member having a center hub which receives a shaft at its axis of rotation.

6. A heat-exchange fan apparatus as claimed in claim 5, wherein the outer circumference of the annular peripheral member is split into two layers so that it can associate with the inner circumference of the opening of the partition wall, to form an intricate but a loose fit combination which serves to avoid or at least minimize the possible intermingling of one fluid with the other in the separate compartments.

7. A heat-exchange fan apparatus as claimed in claim 5, wherein said plane, on which said annular peripheral member lies, and another plane on which said central disk lies, are parallel.

8. A heat-exchange fan apparatus as claimed in claim 7, wherein inner ends of the grooves of said corrugated part are fully sealed with a multiplicity of saw-teeth members laterally projected from one side of the outer periphery of said central disk member and outer ends of the grooves of said corrugated part are fully sealed with a multiplicity of saw-teeth members laterally projected from one side of the inner periphery of said annular peripheral member.

9. A heat-exchange fan apparatus as claimed in claim 5, wherein the outer ends of said grooves are partly sealed with laterally-projected saw-teeth members provided on both sides of said annular peripheral member at its inner circumference in an alternating manner, while the inner ends of said grooves are partly sealed with laterally-projected saw-teeth members provided on the outer periphery of the central disk member in a similar manner.

10. A heat-exchange fan apparatus as claimed in claim 9, wherein said saw-teeth members are integrally molded with said central disk member and with said annular peripheral member, respectively, with metallic or polymeric material.

11. A heat-exchange fan apparatus as claimed in claim 9, wherein apexes of said saw-teeth members projected from said central disk member and from said annular peripheral member are held together with a multiplicity of rib members which are placed at the bottom of said grooves.

12. A heat-exchange fan apparatus as claimed in claim 9, wherein said corrugated part is made of a thin metal sheet having a good heat-conducting property.

13. A heat-exchange fan apparatus in accordance with any one of claims 2, 3, 4, 5, 6, 7, 8, 9, 11, 12, 13 or 14, wherein said impeller is molded with plastics in one integrated body.

14. A heat-exchange fan apparatus for effecting forced circulations of two separate fluids through separate paths and, at the same time, heat-exchanging therebetween, comprising:
(a) a housing which defines a space and encloses,
(b) a fluid impeller of centrifugal thin-disk type, made of heat-conducting material, having an axis of rotation and defining a rotating body which includes at least one plane perpendicular to said axis, and
(c) a partition wall sharing said plane with said impeller, having an opening which encircles said impeller and, in combination with said impeller, serving to divide the space defined by said housing into two compartments, each of which forms a conduit for each of said separate fluids so that each fluid is fed to the housing in a substantially axial direction from either side of the impeller and expelled therefrom in a substantially radial direction with respect to said impeller, wherein:
said impeller has a concentric corrugated zone composed of a multiplicity of radially-extended ridges and complementary grooves which are terminated and merged into said plane at their respective ends, said outer periphery of said corrugated zone being of donut configuration and being supported by an annular peripheral member and the inner periphery thereof being supported by a central disk member having a center hub which receives a shaft at its axis of rotation, the outer ends of said ridges being sealed with laterally-projected comb-teeth members provided on both sides of said annular peripheral member at its inner circumference in an alternating manner, while the inner ends of said ridges are sealed with laterally projected comb-teeth members provided on the outer periphery of the central disk member in a similar manner.

* * * * *